United States Patent
Yang et al.

(10) Patent No.: US 11,256,290 B2
(45) Date of Patent: Feb. 22, 2022

(54) DISPLAY DEVICE

(71) Applicant: Acer Incorporated, New Taipei (TW)

(72) Inventors: Yi-Hsuan Yang, New Taipei (TW); Wu-Chen Lee, New Taipei (TW); Chia-Bo Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/889,711

(22) Filed: Jun. 1, 2020

(65) Prior Publication Data

US 2021/0200261 A1 Jul. 1, 2021

(30) Foreign Application Priority Data

Dec. 30, 2019 (TW) .................................. 108148320

(51) Int. Cl.
*G06F 1/16* (2006.01)
*G06F 1/18* (2006.01)
*F16M 11/04* (2006.01)

(52) U.S. Cl.
CPC ......... *G06F 1/1601* (2013.01); *F16M 11/041* (2013.01); *G06F 1/181* (2013.01); *F16M 2200/024* (2013.01); *G06F 2200/1613* (2013.01); *G06F 2200/1639* (2013.01)

(58) Field of Classification Search
CPC .... G06F 1/1647; G06F 1/1654; G06F 1/1679; H01F 7/0252; H01F 7/0257
See application file for complete search history.

(56) References Cited

U.S. PATENT DOCUMENTS

| | | | |
|---|---|---|---|
| 6,366,440 B1* | 4/2002 | Kung ..................... | E05C 19/16 361/147 |
| 9,645,608 B1* | 5/2017 | Tsai ...................... | G06F 1/1626 |
| 9,746,885 B2* | 8/2017 | Delpier ................ | G06F 1/1679 |
| 9,910,455 B1* | 3/2018 | Morrison .............. | G06F 1/1654 |
| 2012/0068797 A1* | 3/2012 | Lauder .................. | G06F 1/1654 335/285 |
| 2013/0076592 A1* | 3/2013 | Reeves ................. | G06F 3/1454 345/1.3 |
| 2014/0313665 A1 | 10/2014 | Delpier et al. | |
| 2014/0340840 A1* | 11/2014 | Han ....................... | G06F 1/182 361/679.43 |
| 2015/0268699 A1* | 9/2015 | Bathiche ............... | G06F 1/1647 345/1.3 |
| 2020/0233537 A1* | 7/2020 | Hong ..................... | G06F 3/04886 |

FOREIGN PATENT DOCUMENTS

TW M490726 11/2014
TW 201823915 7/2018

* cited by examiner

*Primary Examiner* — Anthony Q Edwards
(74) *Attorney, Agent, or Firm* — JCIPRNET

(57) ABSTRACT

A display device includes a first display and a second display. The first display includes a first body and a first magnet disposed in the first body. The first body has a first side and a slot located at the first side. The first magnet is disposed corresponding to the slot, and the first magnet is adjacent to the first side. The second display is detachably mounted to the first display. The second display includes a second body and a magnetic hook. The second body has a second side and a recess located at the second side, and the magnetic hook is movably disposed in recess. The first side of the first body abuts against the second side of the second body, and the slot is aligned to the recess. The magnetic hook is driven by a magnetic force of the first magnet to be engaged with the slot.

6 Claims, 8 Drawing Sheets

DISPLAY DEVICE

CROSS-REFERENCE TO RELATED APPLICATION

This application claims the priority benefit of Taiwan patent application serial no. 108148320, filed on Dec. 30, 2019. The entirety of the above-mentioned patent application is hereby incorporated by reference here and made a part of this specification.

BACKGROUND

Technical Field

The disclosure relates to an electronic device, and more particularly, to a display device.

Description of Related Art

Notebook computers characterized by multiplexing capabilities, high computing performance, and portability have become indispensable to modern people. The common notebook computers are equipped with one single display; in order to comply with diverse needs of users, a design of multiple displays have been proposed. As regards the existing integrated design of the multiple displays, sub-displays are connected to a main display through a pivoting mechanism, a sliding mechanism, or a combination of the above mechanisms. In one of the operating modes, the sub-display may be stored on the back of or inside the main display; in another operating mode, the sub-display may be moved with respect to the main display and moved to a side of the main display, so as to expand the size of the display screen or achieve picture-in-picture (PIP) display.

However, said integrated design of the multiple displays cannot be assembled and disassembled by the users at will, and such design has the disadvantage of being too heavy and lacking portability.

SUMMARY

The disclosure provides a display device characterized by operation flexibility.

According to an embodiment of the disclosure, a display device including a first display and a second display is provided. The first display includes a first body and a first magnet disposed in the first body. The first body has a first side and a slot located at the first side, wherein the first magnet is disposed corresponding to the slot, and the first magnet is adjacent to the first side. The second display is detachably mounted to the first display. The second display includes a second body and a magnetic hook, wherein the second body has a second side and a recess located at the second side, and the magnetic hook is movably disposed in recess. The first side of the first body abuts against the second side of the second body, and the slot is aligned to the recess. The magnetic hook is driven by a magnetic force of the first magnet to be engaged with the slot.

Based on the above, in the display device provided in one or more embodiments of the disclosure, the first display and the second display may be assembled and disassembled by the users at will according to personal requirements, so the display device is characterized by operation flexibility and portability.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1A:
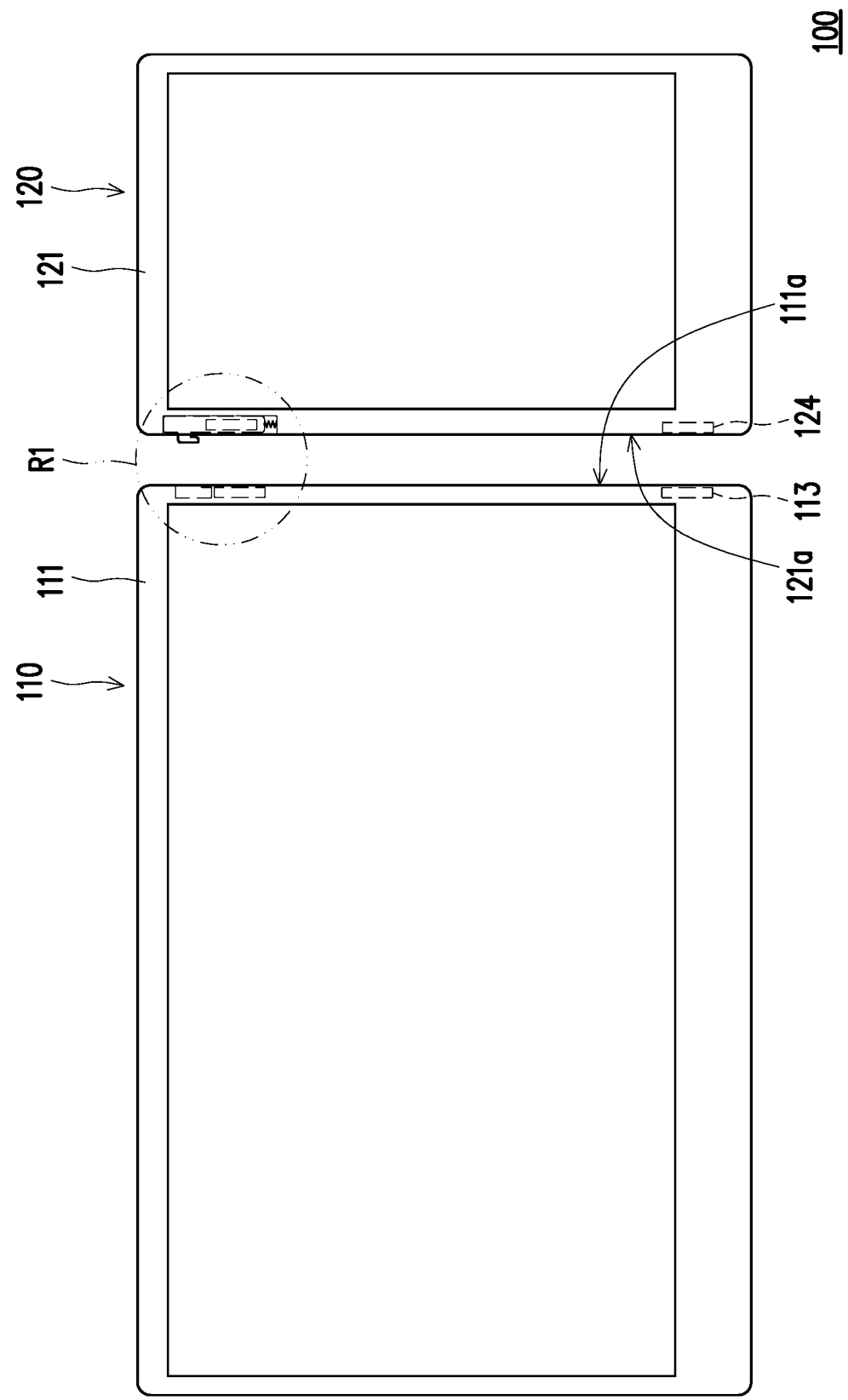
FIG. 1A is a schematic view of a display device before assembly according to a first embodiment of the disclosure.
Figure 1B:
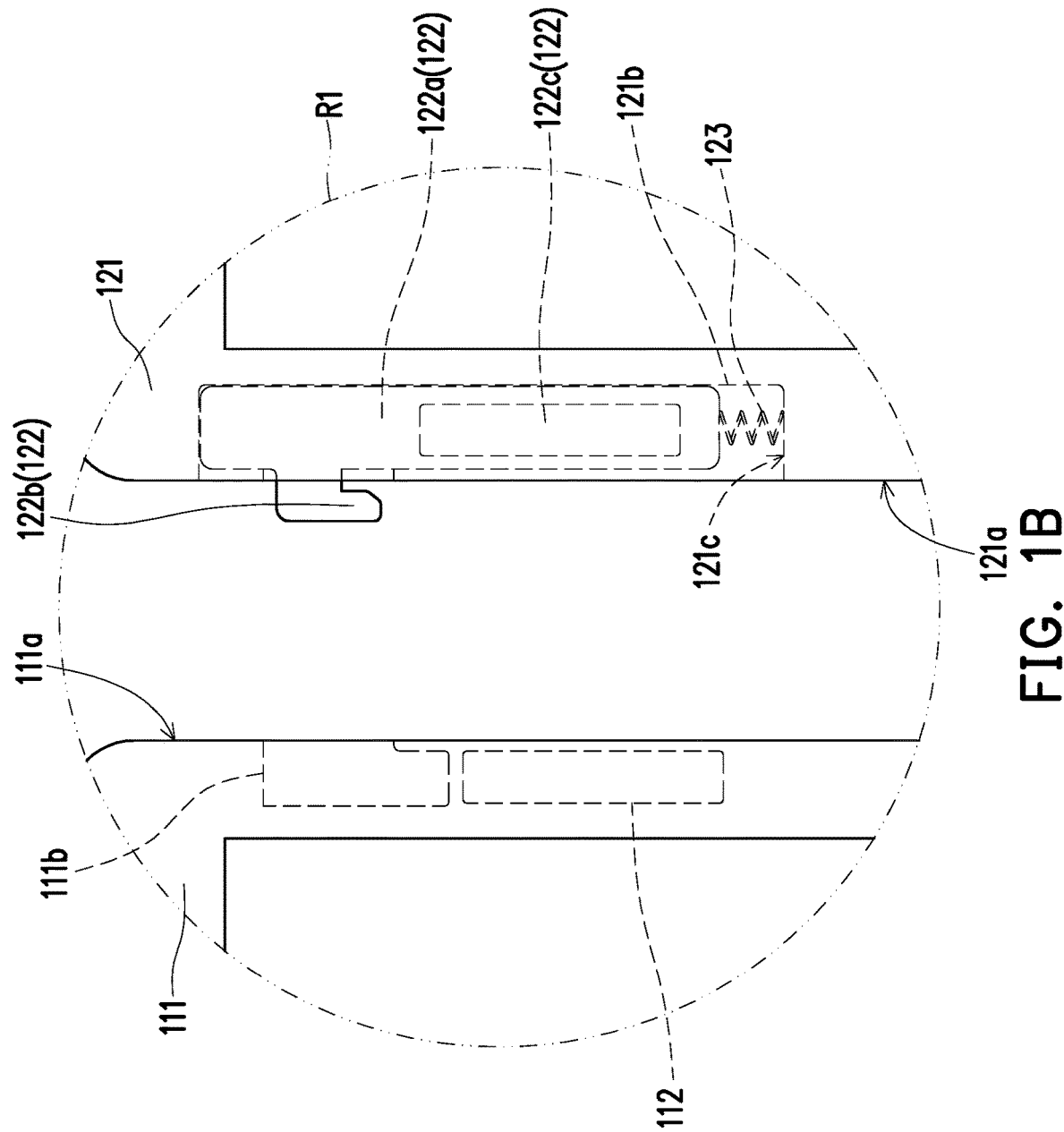
FIG. 1B is a schematic partially enlarged view of a region R1 depicted in FIG. 1A.
Figure 1C:
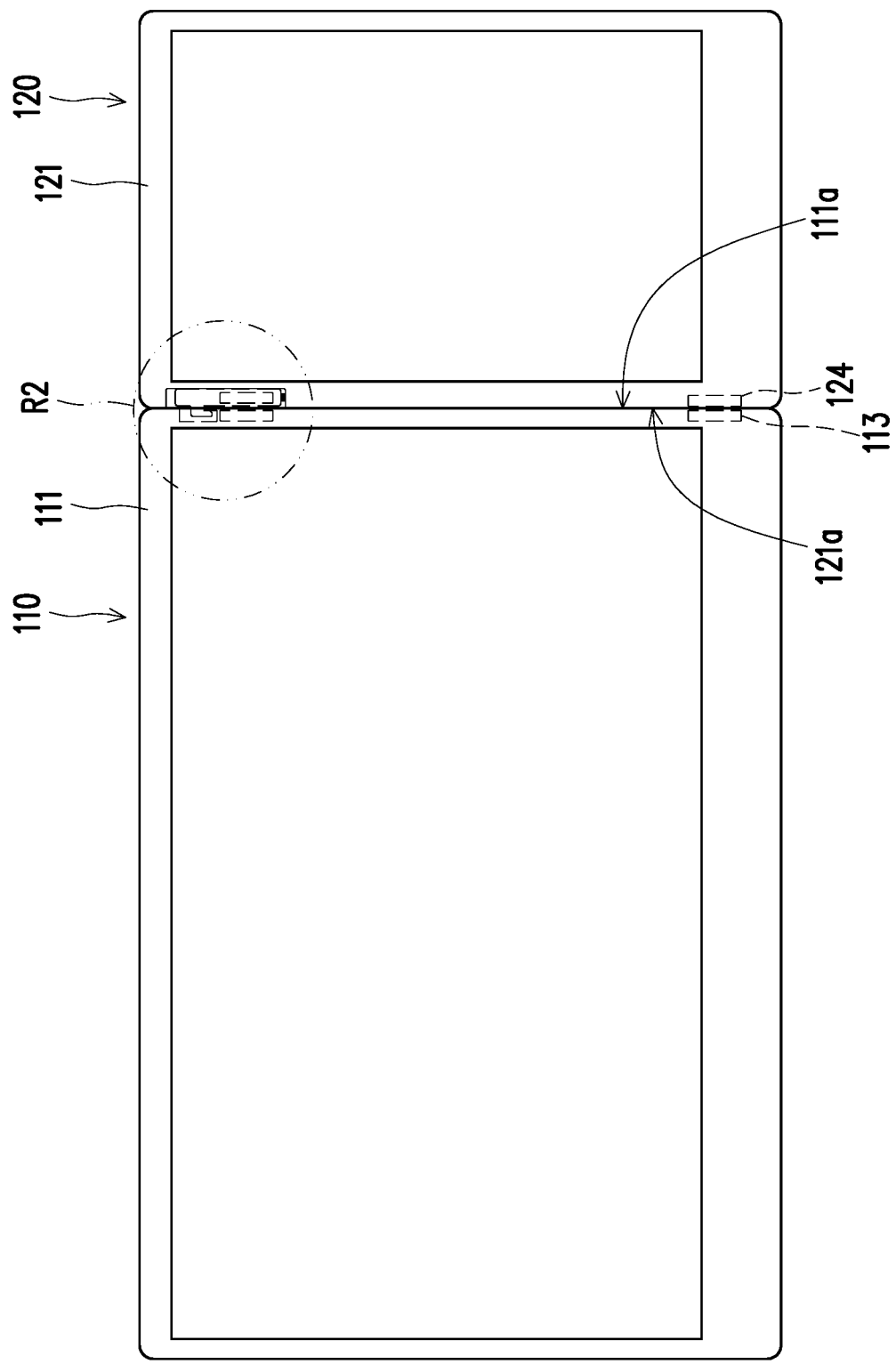
FIG. 1C is a schematic view of the display device depicted in FIG. 1A after assembly.
Figure 1D:
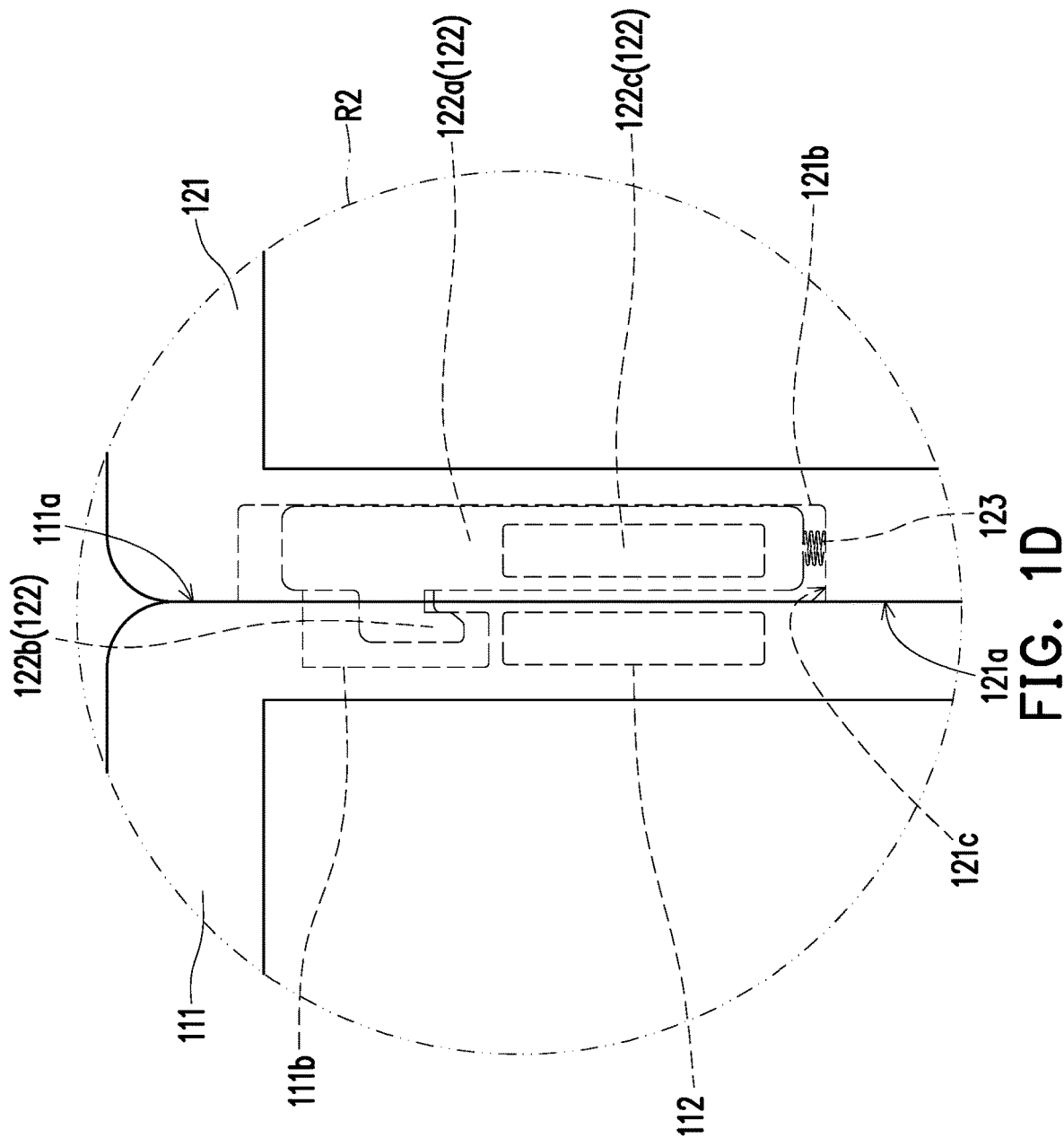
FIG. 1D is a schematic partially enlarged view of a region R2 depicted in FIG. 1C.

FIG. 1A is a schematic view of a display device before assembly according to a first embodiment of the disclosure. FIG. 1B is a schematic partially enlarged view of a region R1 depicted in FIG. 1A. FIG. 1C is a schematic view of the display device depicted in FIG. 1A after assembly. FIG. 1D is a schematic partially enlarged view of a region R2 depicted in FIG. 1C. With reference to FIG. 1A to FIG. 1C, in this embodiment, a display device 100 may be integrated into a notebook computer or other electronic devices. Further, the display device 100 includes a first display 110 and a second display 120, wherein the first display 110 serves as a main display, and the second display 120 serves as a sub-display. A user may assemble and disassemble the first display 110 and the second display 120 at will according to personal needs, so the display device 100 is characterized by operation flexibility and portability.

In particular, the first display 110 includes a first body 111 and a first magnet 112 disposed in the first body 111, and the first magnet 112 may be a permanent magnet. The first body 111 has a first side 111a and a slot 111b located at the first side 111a, wherein the first magnet 112 is disposed corresponding to the slot 111b, and the first magnet 112 is adjacent to the first side 111a. In a direction parallel to the first side 111a, the first magnet 112 is aligned to or overlaps the slot 111b.

The second display 120 includes a second body 121 and a magnetic hook 122, the second body 121 has a second side 121a and a recess 121b located at the second side 121a, and the magnetic hook 122 is slidably disposed in the recess 121b. Specifically, a sliding direction of the magnetic hook 122 is parallel to the second side 121a. The magnetic hook 122 includes a sliding part 122a and a hooking part 122b, and the hooking part 122b is connected to the sliding part 122a. The sliding part 122a is slidably disposed in the recess 121b, and the hooking part 122b penetrates the second body 121 from an opening of the recess 121b; that is, the hooking part 122b is located outside the recess 121b.

In this embodiment, the magnetic hook 122 further includes a second magnet 122c engaged with the sliding part 122a, wherein the second magnet 122c may be a permanent magnet and is configured to generate a magnetic attraction force to the first magnet 112. As shown in FIG. 1B and FIG. 1D, since the second side 121a of the second body 121 abuts against the first side 111a of the first body 111, and the recess 121b is aligned to the slot 111b, the second magnet 122c is driven by the magnetic attraction force of the first magnet 112 to drive the magnetic hook 122 to slide in the recess 121b, so that the hooking part 122b is engaged with the slot 111b, whereby the first display 110 and the second display 120 are completely assembled.

Alternatively, by moving the hooking part 122b of the magnetic hook 122 to approach the slot 111b and into the slot 111b, the first magnet 112 may generate a magnetic attraction force to the second magnet 122c and drives the magnetic hook 122 to slide in the recess 121b, so as to engage the hooking part 122b with the slot 111b, whereby the assembly of the first display 110 and the second display 120 is completed.

As shown in FIG. 1C and FIG. 1D, if a force perpendicular to the first side 111a or the second side 121a is exerted to the first display 110 and the second display 120, the engagement relationship between the magnetic hook 122 and the slot 111b may prevent the first display 110 and the second display 120 from being separated from each other. If it is intended to disassemble the first display 110 from the second display 120, the user may exert a force on the first display 110 and the second display 120, so that the first display 110 and the second display 120 slide relative to each other in a direction parallel to the first side 111a or the second side 121a, so as to release the engagement relationship between the magnetic hook 122 and the slot 111b.

With reference to FIG. 1B and FIG. 1D, in this embodiment, the second display 120 further includes a spring 123 disposed in the recess 121b, and the spring 123 may be a compressed spring. Two ends of the spring 123 are respectively connected to an inner wall surface 121c of the recess 121b and the sliding part 122a. The spring 123 may be configured to provide a restoration force of the magnetic hook 122. When the hooking part 122b of the magnetic hook 122 is engaged with the slot 111b, the sliding part 122a driven by the magnetic attraction force of the first magnet 112 and the second magnet 122c tends to move toward the inner wall surface 121c of the recess 121b. At this time, the spring 123 is squeezed by the sliding part 122a and thus elastically deformed. As long as the magnetic attraction force acting on the magnetic hook 122 is removed, the elastic force of the spring 123 may drive the magnetic hook 122 to be restored.

With reference to FIG. 1A and FIG. 1C, in this embodiment, the first display 110 further includes a first positioning magnet 113 disposed in the first body 111 and adjacent to the first side 111a, and the first positioning magnet 113 may be a permanent magnet. In a direction parallel to the first side 111a, the first positioning magnet 113 is aligned to or overlaps the first magnet 112. On the other hand, the second display 120 also includes a second positioning magnet 124 disposed in the second body 121 and adjacent to the second side 121a, and the second positioning magnet 124 may be a permanent magnet. In a direction parallel to the second side 121a, the second positioning magnet 124 is aligned to or overlaps the recess 121b.

When the first side 111a of the first body 111 abuts against the second side 121a of the second body 121, the first positioning magnet 113 is aligned to or overlaps the second positioning magnet 124 in a direction perpendicular to the first side 111a or the second side 121a, and a magnetic attraction force is generated by the first positioning magnet 113 and the second positioning magnet 124 to improve the reliability of the assembled first display 110 and second display 120.

After the first display 110 and the second display 120 are assembled, the first display 110 and the second display 120 may be electrically connected through a cable or in a wireless manner.

Figure 2A:
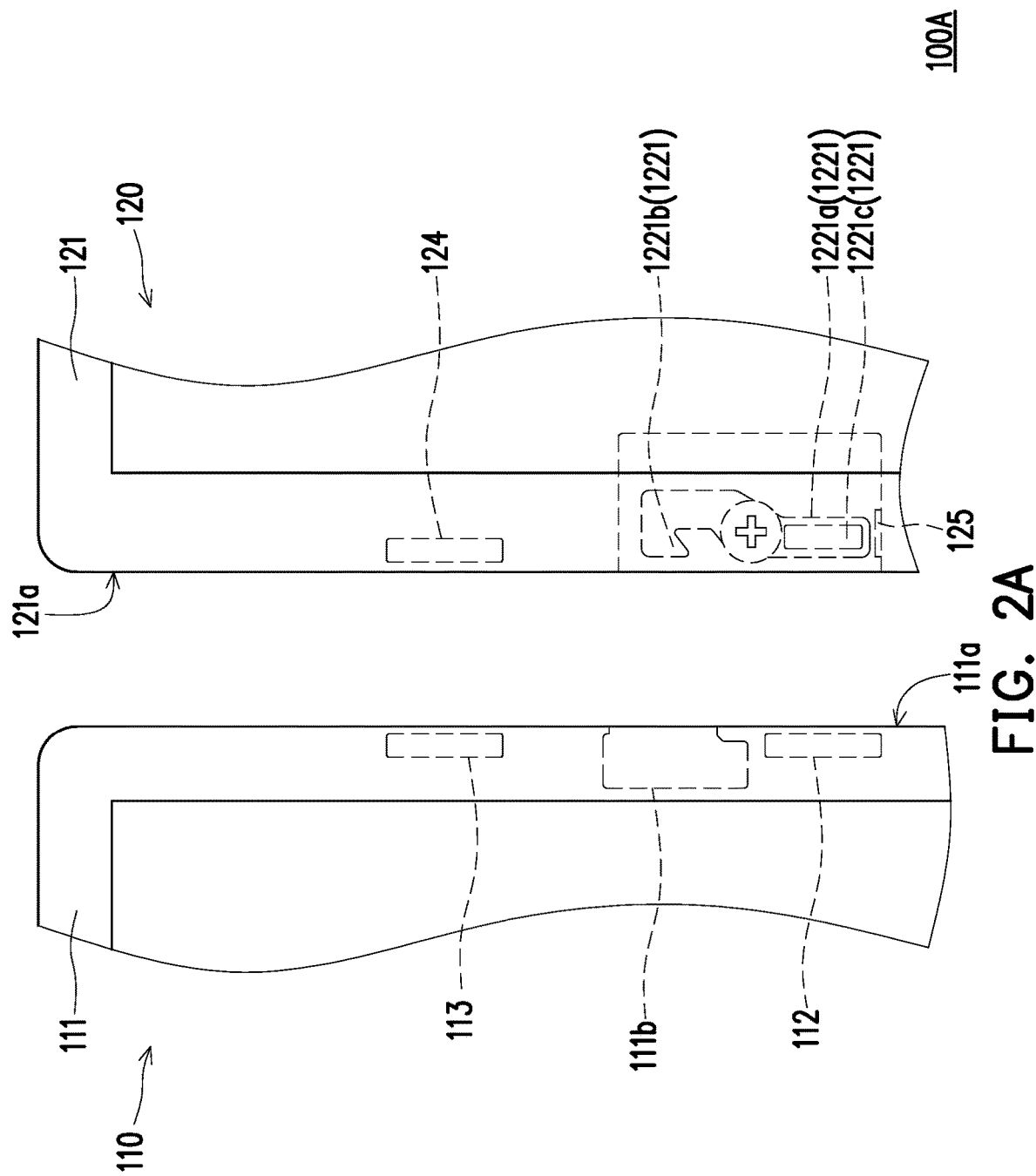
FIG. 2A is a schematic partially enlarged view of a display device before assembly according to a second embodiment of the disclosure.
Figure 2B:
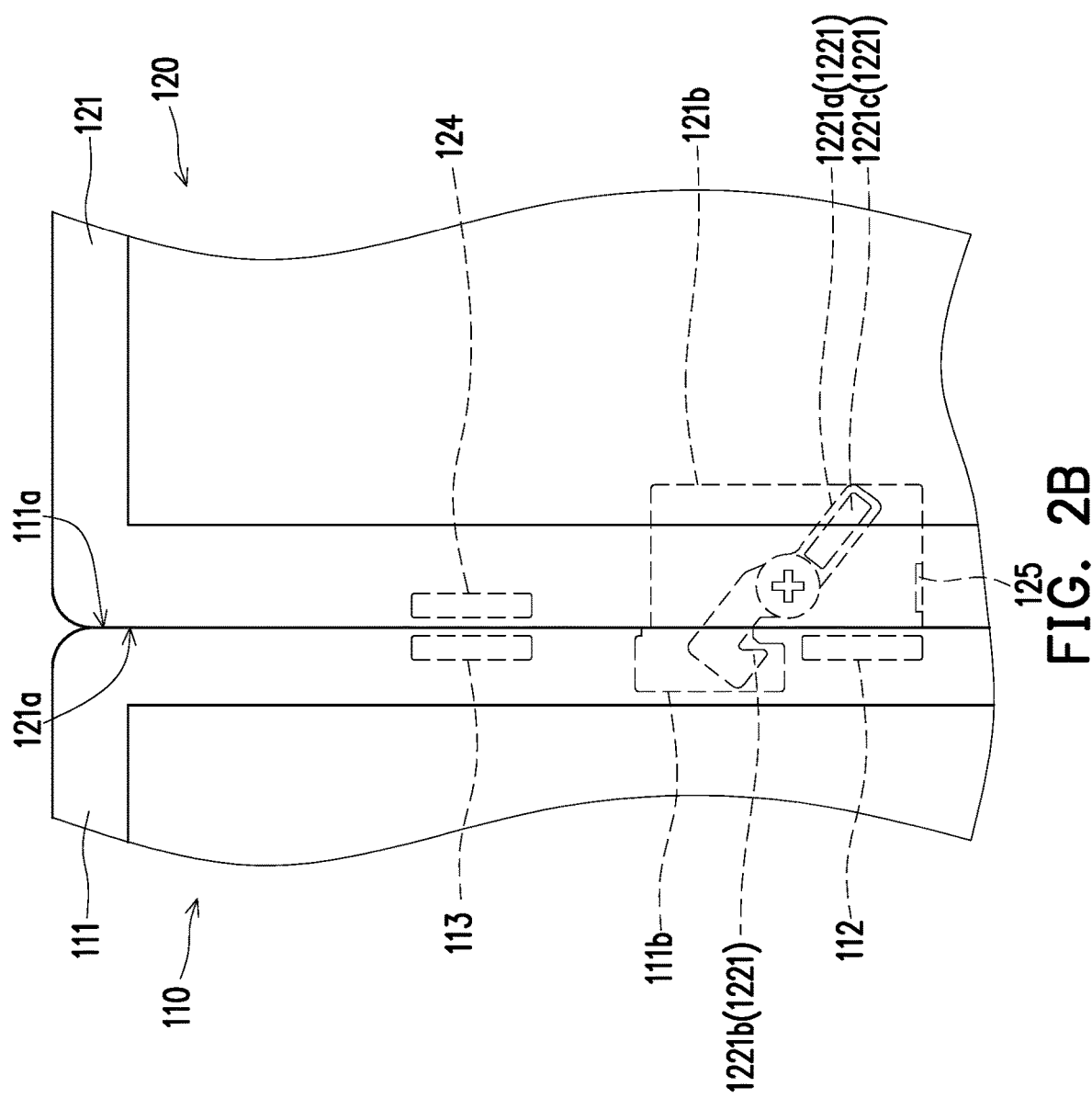
FIG. 2B is a schematic partially enlarged view of the display device depicted in FIG. 2A after assembly.

FIG. 2A is a schematic partially enlarged view of a display device before assembly according to a second embodiment of the disclosure. FIG. 2B is a schematic partially enlarged view of the display device depicted in FIG. 2A after assembly. With reference to FIG. 2A and FIG. 2B, the design principles of a display device 100A provided in the embodiment and the display device 100 provided in the first embodiment are similar, while the difference lies in that the magnetic hook 1221 provided in the present embodiment is rotatably disposed in the recess 121b, and the magnetic hook 1221 includes a pivoting part 1221a and a hooking part 1221b connected to the pivoting part 1221a. The pivoting part 1221a is pivoted into the recess 121b, and the hooking part 1221b is moved out of or back to the recess 121b in response to the rotation of the pivoting part 1221a.

Further, the magnetic hook 1221 further includes a second magnet 1221c engaged with the pivoting part 1221a. Since the second side 121a of the second body 121 abuts against the first side 111a of the first body 111, and the recess 121b is aligned to the slot 111b, the second magnet 1221c is driven by the magnetic repulsive force of the first magnet 112 to drive the pivoting part 1221a to rotate in the recess 121b, so that the hooking part 1221b is moved out of the recess 121b and engaged with the slot 111b, whereby the first display 110 and the second display 120 are completely assembled.

Alternatively, by moving the hooking part 1221b of the magnetic hook 1221 to approach the slot 111b, the second magnet 1221c is driven by the magnetic repulsive force of the first magnet 112 to drive the pivoting part 1221a to rotate in the recess 121b, so that the hooking part 1221b is moved out of the recess 121b and engaged with slot the 111b, the assembly of the first display 110 and the second display 120 is completed. Alternatively, by moving the hooking part 1221b of the magnetic hook 1221 to approach the slot 111b, the first magnet 112 may generate a magnetic attraction force to the second magnet 122c and drives the magnetic hook 122 to slide in the recess 121b, so as to engage the hooking part 122b with the slot 111b, whereby the first display 110 and the second display 120 are completely assembled.

To disassemble the first display 110 from the second display 120, the user may exert the force to the first display 110 and the second display 120, so that the first display 110 and the second display 120 slide relative to each other in a direction parallel to the first side 111a or the second side 121a, and that the engagement relationship between the magnetic hook 1221 and the slot 111b may be released.

In this embodiment, the second display 120 further includes a magnetic member 125 disposed in the recess 121b, and the material of the magnetic member 125 may be iron, cobalt, nickel, or an alloy thereof. The second magnet 1221c generates a magnetic attraction force to the magnetic member 125 to prevent the magnetic hook 1221 from swinging arbitrarily within the recess 121b, thereby achieving the purpose of positioning the magnetic hook 1221. Particularly, the magnetic repulsive force generated by the first magnet 112 and the second magnet 1221c is greater than the magnetic attraction force generated by the second magnet 1221c to the magnetic member 125, so as to ensure that the magnetic hook 1221 may be rotated by the magnetic repulsive force generated by the first magnet 112 and the second magnet 1221c. On the other hand, after the magnetic repulsive force acting on the magnetic hook 1221 is removed, the magnetic attraction force generated by the second magnet 1221c to the magnetic member 125 may ensure that the magnetic hook 1221 is restored.

Figure 3A:
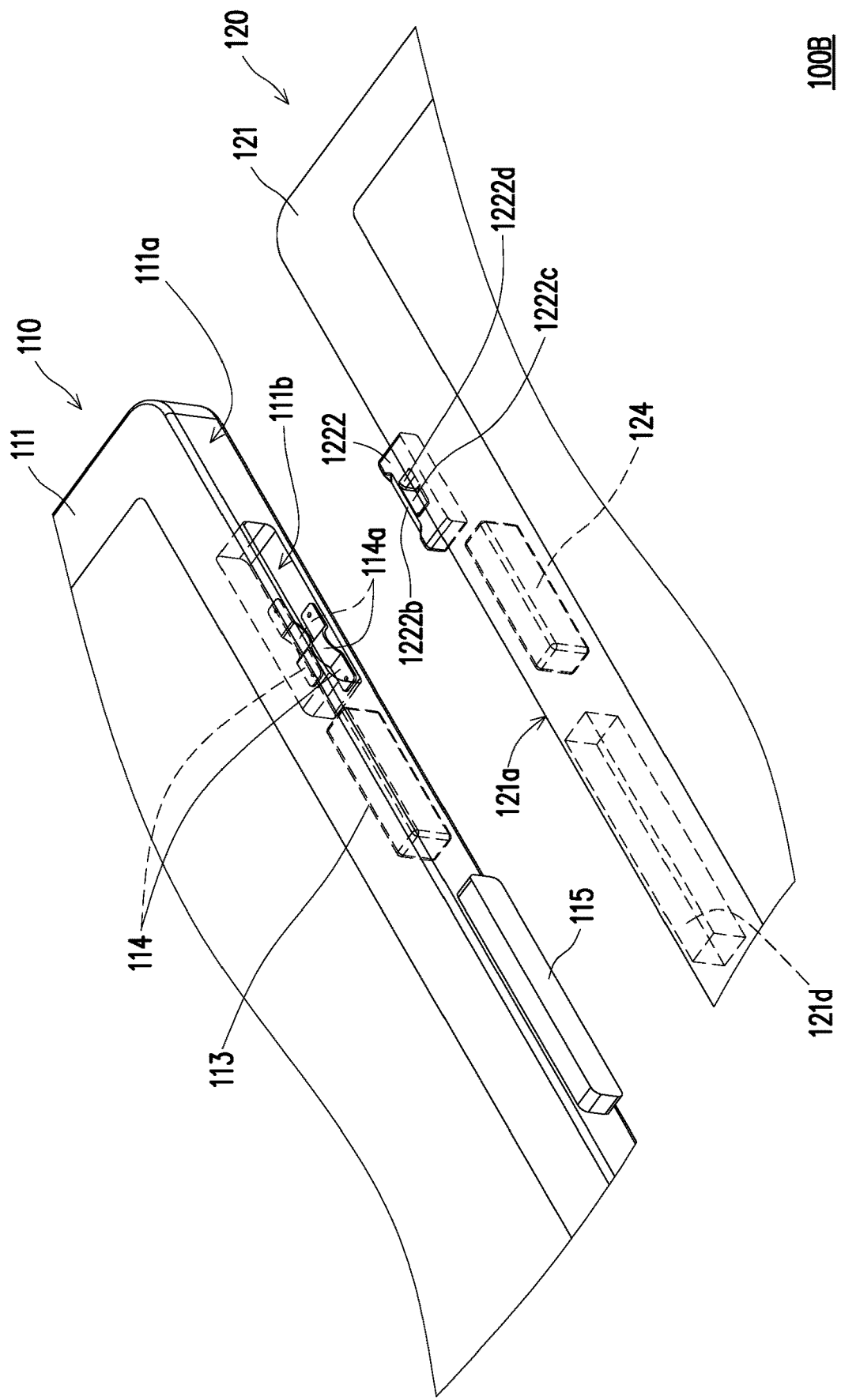
FIG. 3A is a schematic partially enlarged view of a display device before assembly according to a third embodiment of the disclosure.
Figure 3B:
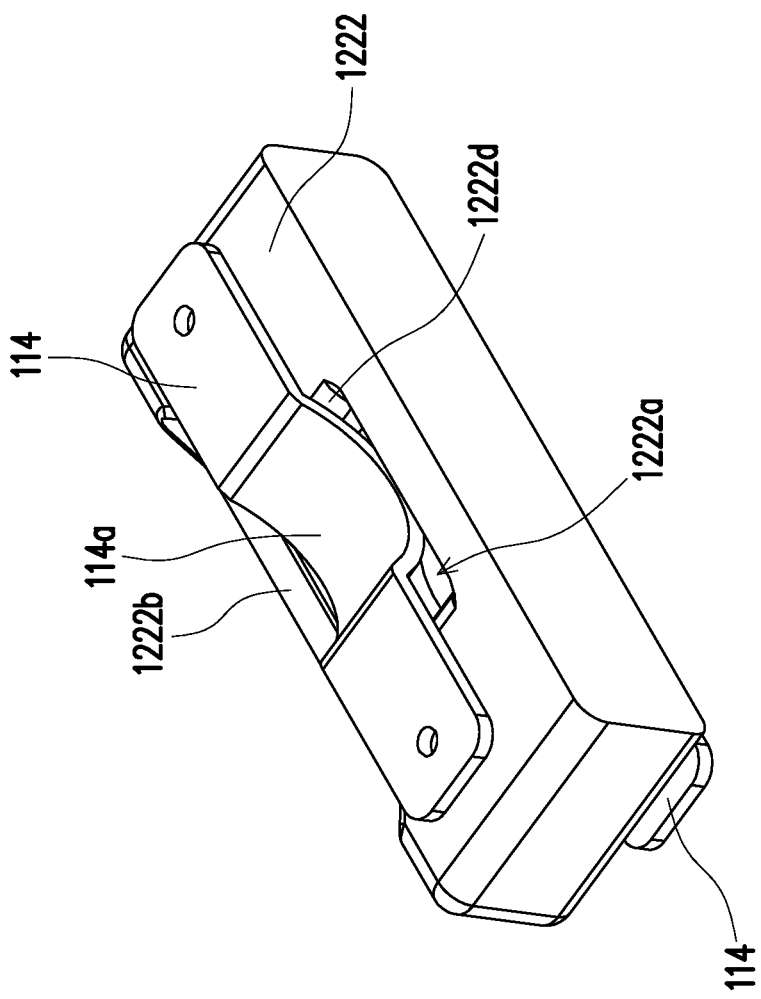
FIG. 3B is a schematic view of assembling a hook and an elastic fastener depicted in FIG. 3A.

FIG. 3A is a schematic partially enlarged view of a display device before assembly according to a third embodiment of the disclosure. FIG. 3B is a schematic view of assembling a hook and an elastic fastener depicted in FIG. 3A. With reference to FIG. 3A, the design principles of a display device 100B provided in the embodiment and the display device 100 provided in the first embodiment are similar, while the difference lies in that a hook 1222 of the second display 120 is fixed to the second side 121a of the second body 121; that is, the hook 1222 does not have a degree of freedom of movement or rotation with respect to the second body 121. On the other hand, the hook 1222 does not generate any magnetic force, and the first body 111 is not equipped with any magnet corresponding to the slot 111b.

As shown in FIG. 3A and FIG. 3B, the first display 110 includes an elastic fastener 114. The number of the elastic fastener 114 may be two, and the elastic fasteners 114 are arranged in groups in the slot 111b. Each elastic fastener 114 has an elastic protrusion 114a, two of the elastic fasteners 114 are juxtaposed, and the elastic protrusion 114a of one of the two elastic fasteners 114 faces the elastic protrusion 114a of the other elastic fastener 114a. Besides, the hook 1222 has a hole 1222a for the two elastic fasteners 114.

When the hook 1222 moves into the slot 111b in a direction perpendicular to the first side 111a or the second side 121a, the elastic protrusion 114a of each elastic fastener 114 is squeezed by the hook 1222, which leads to elastic deformation. Until the elastic protrusion 114a of each elastic fastener 114 is aligned to the hole 1222a, the hook 1222 stops moving, and the elastic protrusion 114a of each elastic fastener 114 is restored and engaged into the hole 1222a, so that the hook 1222 is clamped and locked between the two elastic fasteners 114. As such, the assembled first display 110 and second display 120 may be prevented from being separated from each other.

In this embodiment, the hook 1222 has a first guiding surface 1222b and a stopper 1222c opposite to the first guiding surface 1222b, and the stopper 1222c is located in the hole 1222a. When the hook 1222 moves into the slot 111b in a direction perpendicular to the first side 111a or the second side 121a, the elastic protrusion 114a of each elastic fastener 114 may slide along the first guiding surface 1222b and is squeezed, which leads to elastic deformation. Until the elastic protrusion 114a of each elastic fastener 114 is aligned to the hole 1222a, the elastic protrusion 114a of each elastic fastener 114 is restored and engaged into the hole 1222a, and the stopper 1222c prevents the elastic protrusion 114a of each elastic fastener 114 from being removed from the hole 1222a in a direction perpendicular to the first side 111a or the second side 121a.

On the other hand, the hook 1222 further has a second guiding surface 1222d connected to the stopper 1222c, and the second guiding surface 1222d is located in the hole 1222a. If the hook 1222 and each elastic fastener 114 slide with respect to each other in a direction parallel to the first side 111a or the second side 121a, the elastic protrusion 114a of each elastic fastener 114 may slide along the second guiding surface 1222d and is moved out of the hole 1222a, whereby the engagement relationship between the hook 1222 and the two elastic fasteners 114 is released.

After the first display 110 and the second display 120 are assembled, the first display 110 and the second display 120 may be electrically connected through a cable or in a wireless manner. For instance, the first side 111a of the first body 111 is equipped with an electrical plug 115, and the second side 121a of the second body 121 is equipped with an electrical pin 121d. After the first display 110 and the second display 120 are assembled, the electrical plug 115 is inserted into the electrical pin 121d, so that the first display 110 and the second display 120 are electrically connected through the cable.

To sum up, in the display device provided in one or more embodiments of the disclosure, the first display and the second display may be assembled and disassembled by the user at will according to personal requirements, so the display device is characterized by operation flexibility and portability. Specifically, the first display is equipped with the slot and the first magnet, and the second display is equipped with the magnetic hook. By moving the magnetic hook of the second display to approach the slot of the first display, the first magnet generates the magnetic attraction force or the magnetic repulsive force to the magnetic hook, which drives the magnetic hook to be engaged into the slot, whereby the assembly of the first display and the second display is completed. By contrast, the first display and the second display may slide with respect to each other, so as to release the engagement relationship between the magnetic hook and the slot. Therefore, for the user, the method of disassembling the display device provided in one or more embodiments of the disclosure is simple and intuitive, and the operation is extremely convenient.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A display device, comprising:
a first display, comprising a first body and a first magnet disposed in the first body, wherein the first body has a first side and a slot located at the first side, the first magnet is disposed corresponding to the slot, and the first magnet is adjacent to the first side; and
a second display, detachably mounted to the first display, the second display comprising a second body and a magnetic hook, wherein the second body has a second side and a recess located at the second side, and the magnetic hook is movably disposed in the recess,
wherein the first side of the first body abuts against the second side of the second body, the slot is aligned to the recess, and the magnetic hook is driven by a magnetic force of the first magnet to be engaged with the slot,
the magnetic hook is slidably disposed in the recess and comprises a sliding part, a hooking part connected to the sliding part and a second magnet engaged with the sliding part, wherein the sliding part is slidably disposed in the recess, and the hooking part is located outside the recess, a magnetic attraction force is generated by the first magnet and the second magnet.

2. The display device according to claim 1, wherein the second display further comprises a spring disposed in the recess, and two ends of the spring are respectively connected to the sliding part and an inner wall surface of the recess.

3. The display device according to claim 1, wherein the first display further comprises a first positioning magnet disposed in the first body and adjacent to the first side, the second display further comprises a second positioning magnet disposed in the second body and adjacent to the second side, the first side of the first body abuts against the second side of the second body, and the first positioning magnet is aligned to the second positioning magnet to generate a magnetic attraction force.

4. A display device, comprising:
- a first display, comprising a first body and a first magnet disposed in the first body, wherein the first body has a first side and a slot located at the first side, the first magnet is disposed corresponding to the slot, and the first magnet is adjacent to the first side; and
- a second display, detachably mounted to the first display, the second display comprising a second body and a magnetic hook, wherein the second body has a second side and a recess located at the second side, and the magnetic hook is movably disposed in the recess, wherein the first side of the first body abuts against the second side of the second body, the slot is aligned to the recess, and the magnetic hook is driven by a magnetic force of the first magnet to be engaged with the slot, the magnetic hook is rotatably disposed in the recess and comprises a pivoting part, a hooking part connected to the pivoting part and a second magnet engaged with the pivoting part, wherein the pivoting part is pivoted to the recess, and the hooking part is moved out of or back to the recess in response to rotation of the pivoting part, a magnetic repulsive force is generated by the first magnet and the second magnet.

5. The display device according to claim 4, wherein the second display further comprises a magnetic member disposed in the recess, the second magnet generates a magnetic attraction force to the magnetic member, and the magnetic repulsive force generated by the first magnet and the second magnet is greater than the magnetic attraction force generated by the second magnet to the magnetic member.

6. The display device according to claim 4, wherein the first display further comprises a first positioning magnet disposed in the first body and adjacent to the first side, the second display further comprises a second positioning magnet disposed in the second body and adjacent to the second side, the first side of the first body abuts against the second side of the second body, and the first positioning magnet is aligned to the second positioning magnet to generate a magnetic attraction force.

* * * * *